United States Patent [19]
Muramatsu

[11] Patent Number: 6,006,322
[45] Date of Patent: Dec. 21, 1999

[54] ARITHMETIC LOGIC UNIT AND MICROPROCESSOR CAPABLE OF EFFECTIVELY EXECUTING PROCESSING FOR SPECIFIC APPLICATION

[75] Inventor: Tsuyoshi Muramatsu, Nara, Japan

[73] Assignee: Sharp Kabushiki Kaisha, Osaka, Japan

[21] Appl. No.: 08/957,783

[22] Filed: Oct. 24, 1997

[30] Foreign Application Priority Data

Oct. 25, 1996 [JP] Japan ................................. 8-283999

[51] Int. Cl.[6] ...................................................... G06F 9/30
[52] U.S. Cl. .............................. 712/200; 712/36; 712/37; 712/221
[58] Field of Search .............................. 395/376, 800.36, 395/800.37, 562, 563, 564; 712/200, 221, 222, 223, 36, 37

[56] References Cited

U.S. PATENT DOCUMENTS

| | | | |
|---|---|---|---|
| 5,574,942 | 11/1996 | Colwell et al. | 395/376 |
| 5,694,360 | 12/1997 | Iizuka et al. | 365/185.33 |
| 5,748,979 | 5/1998 | Trimberger | 395/800.37 |
| 5,752,035 | 5/1998 | Trimberger | 395/705 |
| 5,829,031 | 10/1998 | Lynch | 711/137 |

FOREIGN PATENT DOCUMENTS

| | | |
|---|---|---|
| 4-37312 | 2/1992 | Japan . |
| 4-199228 | 7/1992 | Japan . |

OTHER PUBLICATIONS

Andre Detton, "Notes on Coupling Processors with Reconfigurable Logic," Transit Note #118, MIT Transit Project, Mar. 21, 1995.

*Primary Examiner*—William M. Treat

[57] ABSTRACT

An arithmetic logic unit capable of executing an instruction belonging to a user-defined instruction area at the same clock frequency as a hard-wired logic includes a memory storing data at an arbitrary address and outputting the data stored in the address when an instruction code and an operand data are applied as an address. When an instruction decoder decoding part of the instruction code for setting the memory to read mode or write mode is provided, contents of the memory can be re-written, and therefore the content of the memory can be readily changed even after delivery. The arithmetic logic unit may include, in place of the memory, a programmable logic device adapted to receive an instruction code and the operand data and capable of organizing a desired logic.

29 Claims, 7 Drawing Sheets

| INSTRUCTION CODE | OPERATION |
|---|---|
| 0 | AND |
| 1 | OR |
| 2 | SUB |
| 15 | ADD |
| 16<br><br>31 | USER-DEFINED AREA |

| INSTRUCTION CODE | OPERATION |
|---|---|
| 0 | AND |
| 1 | OR |
| 2 | EX-OR |
| 3 | EX-NOR |
| 4 | SHIFT |
| 5 | ROTATE |
| ⋮ | ⋮ |
| ⋮ | ⋮ |
| $2^i-1$ | ADD |

ARITHMETIC LOGIC UNIT AND MICROPROCESSOR CAPABLE OF EFFECTIVELY EXECUTING PROCESSING FOR SPECIFIC APPLICATION

BACKGROUND OF THE INVENTION

1. Field of the Invention

The present invention relates to a microprocessor and an arithmetic logic unit (ALU) used in the microprocessor. More specifically, the present invention relates to a microprocessor and an arithmetic logic unit allowing user setting for effective operation for specific application.

2. Description of the Background Art

An RISC (Reduced Instruction Set Computer) or a DST (Digital Signal Processor) contains an ALU. FIG. 7 schematically shows a structure of a conventional DSP. Referring to FIG. 7, DSP 100 includes an instruction memory 110, a program counter (PC) 114 designating a specific address in instruction memory 110, an instruction decoder 112 for reading and decoding an instruction from an address of instruction memory 110 designated by PC 114, an incrementor 116 for incrementing by one (adding one to) the output of PC 114, an adder 118 for adding a relative branch address output from instruction decoder 112 to the output of PC 114, and a multiplexer (MUX) 140 for selecting and setting in PC 114 one of the output from incrementor 116, the output from adder 118 and a constant "0". The constant "0" is set in PC 114 at the time of resetting. PC 114, incrementor 116, adder 118 and MUX 120 control order of reading instruction from instruction memory 110 in accordance with a result of processing by ALU 124.

DSP 100 further includes an ALU 124 for performing an operation on two input operands and for outputting result of operation, based on an instruction code Op applied from instruction decoder 112, a register file 126 for storing an output from ALU 124 at an address R output from instruction decoder 112 or for outputting data from address R, an RAM 122 receiving and storing an output from register file 126 at a prescribed address, and two MUXs 128 and 130 each receiving output from RAM 122 and register file 126, selecting either of these under the control of instruction decoder 122 and applying the selected one to ALU 124 as operand data.

The operation of DSP 100 shown in FIG. 7 will be briefly described in the following. First, MUX 120 selects "0" and sets it in PC 114, and an instruction read from address 0 of instruction memory 110 is decoded by instruction decoder 112. Consequently, DSP 100 starts its operation. Instruction decoder 112 decodes an instruction and outputs instruction code Op and address or addresses R of register file 126, which are applied to ALU 124 and register file 126, respectively. When the instruction is a branch instruction (in this case, only a relative branch), instruction decoder 112 applies relative branch address to adder 118.

Register file 126 outputs data from address R applied from instruction address 122, and RAM 122 also outputs data from an address designated by instruction decoder 122. Each of MUXs 128 and 130 selects either the output from register file 126 or the output from RAM 122 under the control of instruction decoder 112, and applies the selected one to ALU 124. ALU 124 performs a processing designated by instruction code Op applied from instruction decoder 112 on two operands, and outputs the result of processing to register file 126. Register file 126 stores the data at an address designated by instruction decoder 112.

Incrementor 116 increments by one the output of PC 114 and applies it to MUX 120. MUX 120 selects either incrementor 116 or adder 118 in accordance with control of instruction decoder 112, and sets an output of the selected one in PC 114. MUX 120 generally selects the output from incrementor 116 and it selects the output from adder 118 only when the instruction is a branch instruction.

FIG. 8 shows examples of number of input/output bits and number of bits of instruction codes to ALU 124. It is assumed that instruction code to ALU 124 has i bits, each of first and second operand data has n bits, and resulting data has n bits.

In an arithmetic logic unit represented by ALU 124 and in an arithmetic logic unit as a single chip LSI (Large Scale Integrated Circuit), all the available instruction sets are determined in advance, an example of which is shown in FIG. 9.

When an instruction code has i bits, there may be $2^i$ different instruction codes from 0 to $2^i-1$, as shown in FIG. 9. These instruction codes have corresponding processing contents determined respectively. The contents of processing are all determined in advance by the supplier of the ALU, and the contents cannot be changed by the user, since ALU 124 is realized by hard-wired logics and ROMs, of which logic cannot be changed by the user.

However, in the arithmetic logic unit in which all the instruction sets are determined in advance, these instructions are provided for general purposes, and therefore these are not always very effective when applied to a specific use. It has been known that performance of an arithmetic logic unit used in a specific application is remarkably improved by providing an instruction dedicated to the specific application and allowing effective execution of that instruction. One such example includes an underflow/overflow processing in integer operation.

Let us consider signed 8 bit addition in an 8 bit ALU, as an example. In this case, the signed 8 bit data is in 2's complement representation and assumes a value within the range of −128 to 127. Here, "overflow" refers to a case where result of addition exceeds 127, and "underflow" refers to a case where the result is smaller than −128. Consider an addition of "7F+7F" in hexadecimal notation. In general addition, the result is FE (hexadecimal notation). However, since this result is regarded as a signed integer in a conventional ALU, it is interpreted as "−2", which value is meaningless when viewed as the result of operation.

This problem causes lower efficiency in processing especially in the field handling image and video data. A large amount of data must be handled in the field of image and video processing. Therefore, the number of bits of each data is reduced to be as small as possible, and processing is performed with the minimum length of data. This tends to cause the aforementioned problem of underflow/overflow. In other fields, sufficient number of bits are generally allotted to data so as to reduce the possibility of underflow/overflow. Therefore, the problem of underflow/overflow is less likely.

In the field handling image and video data, the problem caused by such underflow/overflow has been solved by programming. For example, in the signed 8 bit addition described above, the range of the value of the result of operation is limited such that when the result of operation is below −128, −128 is output, and when the result exceeds 127, 127 is output.

This example is represented by the following equation.

7F (hexadecimal notation)+7F (hexadecimal notation)=7F (hexadecimal notation)

In the conventional ALU, this process is realized by using a plurality of instruction steps. However, this is one reason why the processing is not efficient enough for the processing of this field by the conventional ALU. When an addition instruction involving underflow/overflow processing is prepared in advance and the hard-wired logic of the ALU is adapted to execute such instruction in the similar manner as other instructions, it is clear that the actual processing efficiency in the field handling image and video data can be significantly improved.

Consider a simple IIR filter (Infinite Impulse Response Filter) shown in FIG. 10, for example. The processing shown in FIG. 10 is to multiply an input by α, add the result to an output $Z^{-1}$ of this processing of the last cycle multiplied by β, and to output the result of addition. When this processing is executed by the conventional ALU and a microprocessor containing such an ALU, the following sequential processing was necessary.

(1) The input is multiplied by α and stored in a register.
(2) The value ($Z^{-1}$) stored as an output of the last cycle is multiplied by β.
(3) The stored input multiplied by α is added to the output of the last cycle multiplied by β, and the result of addition is stored.
(4) The stored value is outputted as a result of operation.
(5) The output value is stored as the value of the last cycle.

Since such a processing including five steps is carried out sequentially, five steps (five cycles of DSP) have been necessary to realize an IIR filter, when the conventional DSP is used. When a DSP having clock frequency of 50 MHz is used, the maximum rate of processing of the IIR filter is 10 MHz, and higher rate of processing is not available. When the rate of processing as high as 50 MHz is required of the IIR filter, a DSP having operational clock frequency of 250 MHz is necessary, which means that it is difficult to realize such a filter as long as the conventional DSP is used.

Further, various and many filter characteristics are desired in filtering using IIR filter or the like. Sometimes filters of different characteristics are required simultaneously in a specific application. Higher speed operation to some extent is possible when the IIR filter is implemented as a hardware (hard-wired logic). In that case, the hardware logic must be changed on each occasion in accordance with the user's request, and when the application is changed, a different logic must be prepared.

Some of the conventional CISCs (Complex Instruction Set Computers) have control storage implemented by RAM. In such a CISC, it is possible to describe a relatively complicated processing in one step as a macro instruction to be applied to the CISC, by reforming the contents of the control storage. However, since the ALU is built-in, execution of the macro instruction means execution of a plurality of steps of the micro instructions stored in the control storage, and therefore operation at the same clock frequency as the hard-wired logic is not possible.

SUMMARY OF THE INVENTION

Therefore, an object of the present invention is to provide an arithmetic logic unit and a microprocessor which can be adapted to efficiently execute processing for user specific application.

Another object of the present invention is to provide an arithmetic logic unit and a microprocessor which can be adjusted after delivery, so as to enable efficient execution of processing for user specific application.

An additional object of the present invention is to provide an arithmetic logic unit and a microprocessor having simple structure which can be adapted to efficiently execute processing for user specific application.

A still further object of the present invention is to provide an arithmetic logic unit and a microprocessor which allows execution of processing for a user specific application at the same clock frequency as hard-wired logic.

An additional object of the present invention is to provide an arithmetic logic unit and a microprocessor which readily solves the problem of overflow and underflow.

In the ALU in accordance with the present invention, at least part of an instruction space is a user-defined instruction area. The ALU is capable of executing an instruction belonging to the user-defined instruction area at the same clock frequency as the hard-wired logic, and includes a memory storing data at an arbitrary address and outputting data stored in that address when an instruction code and an operand data are applied as an address.

Since at least part of the instruction space is used as the user-defined instruction area, the user can organize and utilize an instruction scheme suitable for his or her application. It is possible to specify a desired result for a certain combination of an instruction code and the operand data, for a specific application. Such resulting data is stored in the memory, using the corresponding instruction code and operand data as an address. When the instruction code and the operand data are applied as the address to the memory at the time of execution, the data stored in that address is output from the memory. Namely, the memory operates as if it is a conventional ALU. Since the data stored in the designated address is output from the memory immediately after the address input, the user-defined instruction is executed at the same clock frequency as the hard-wired logic. Degradation of processing efficiency is not experienced. Further, the ALU can be implemented by using standard function of the memory, and complicated control circuit is not necessary.

The memory may be a random access memory, a mask ROM, or a nonvolatile memory which allows writing and reading of arbitrary data to and from an arbitrary address. By decoding part of the instruction code to enable setting of the memory to reading mode or writing mode, it becomes possible to rewrite the contents of the memory. This allows change in contents of the memory even after delivery.

Preferably, the ALU is adapted to receive an instruction code and operand data, and includes programmable logic capable of organizing a desired logic.

Since a desired logic can be organized by using a programmable logic, it is possible for the user to determine an instruction scheme which he or she wishes to utilize, and to realize the function to be provided by the instruction code used in the instruction scheme by the programmable logic. Since the programmable logic is operable in the similar manner as the hard-wired logic, it can efficiently execute the user-defined instruction.

More preferably, the ALU includes a hard-wired logic ALU for executing an instruction belonging to an area other than the user-defined instruction area, the ALU of the present invention consisting of a programmable logic or a memory and receiving an instruction code, and a selector for selecting and effectively operating either one of the hard-wired logic ALU and the ALU of the present invention.

Instructions for general purposes may be executed by the conventional hard-wired logic ALU. The user has only to set the memory or the programmable logic such that only the function especially desirable for the specific application is executed as the user-defined instruction, and therefore the system can readily be organized.

The microprocessor in accordance with the present invention includes, in addition to the ALU of the present invention described above, a memory for storing the user-defined instruction, and a circuitry for controlling reading of instruction of the instruction memory such that the instructions stored in the instruction memory are output in an order determined in accordance with the result of execution by the ALU.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
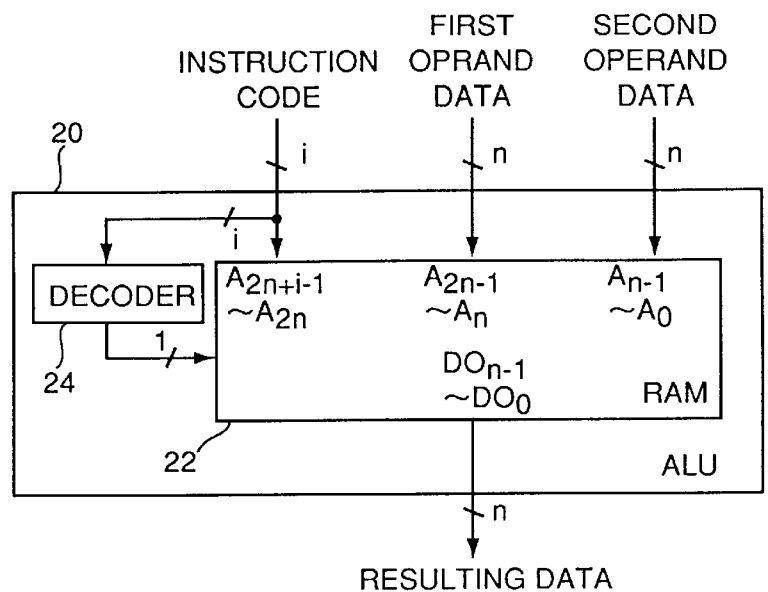
FIG. 1 is a block diagram of an ALU in accordance with one embodiment of the present invention.
Figure 7:
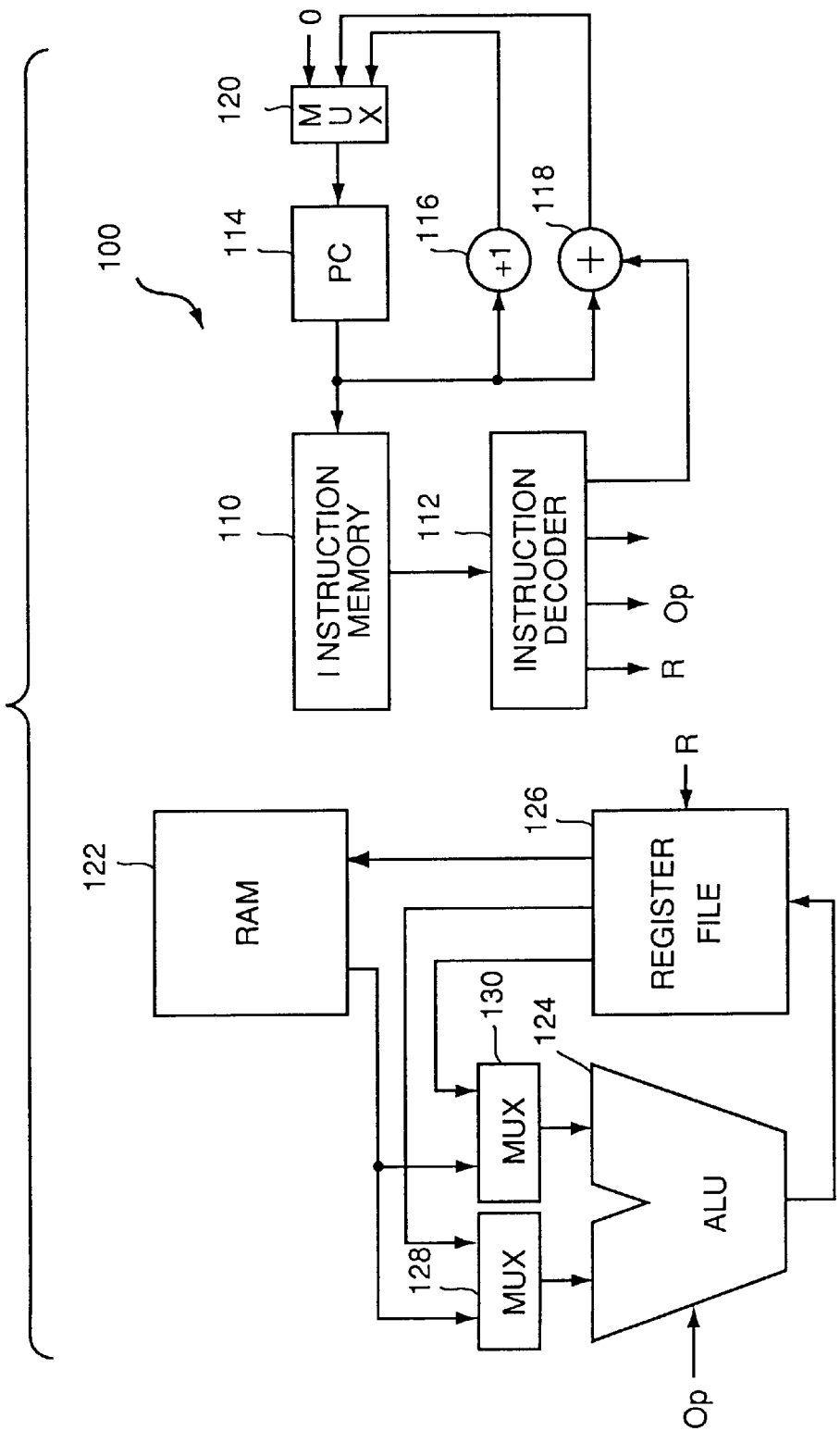
FIG. 7 is a block diagram of a DSP which is an example of the conventional microprocessor.
Figures 8, 9:
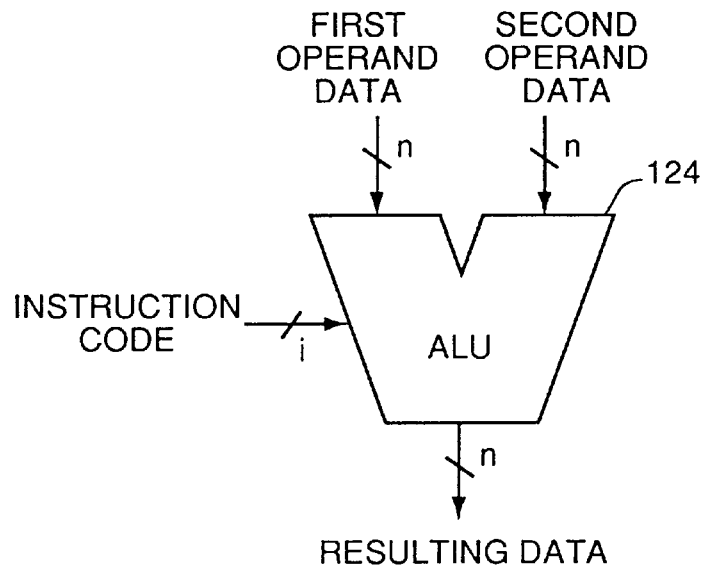
FIG. 8 shows an ALU.
FIG. 9 shows, in a table, instruction set used in the conventional ALU.

FIG. 1 shows a structure of an ALU 20 in accordance with a first embodiment of the present invention. Referring to FIG. 1, ALU 20 includes an RAM 22 receiving an instruction code (i bits), a first operand data (n bits) and second operand data (n bits) as address data, for outputting resulting data of n bits; and a decoder 24 receiving the instruction code of i bits, decoding the instruction code and applying a signal for setting RAM 22 to read/write operational mode. The ALU 20 may be used as it is, in place of ALU 124 of DSP 100 shown in FIG. 7. In this case, instruction code Op applied from instruction decoder 112 corresponds to the instruction code of i bits, and data applied from MUXs 128 and 130 correspond to the first and second operand data, respectively.

ALU 20 shown in FIG. 1 is an example of the ALU in which all the instruction area is used as the user-defined area. At an address determined by a combination of an instruction code and operand data of RAM 22, a desired result obtained when a desired processing designated by the instruction code is performed on the operand data is calculated and stored in advance. When the instruction code is decoded by decoder 24 and it is determined that it requires reading, the resulting data stored in the designated address is output from RAM 22. The resulting data is the desired result obtained when processing designated by the instruction code is executed with the first and second operand data applied as operand, and therefore ALU 20 operates as if it were an ALU consisting of the hard-wired logic. The necessary clock cycle is therefore only one cycle for reading.

For writing the desired data to RAM 22 in advance, a specific instruction is prepared among instruction codes. Decoder 20 controls RAM 22 such that when the instruction is detected, RAM 22 writes either the first or second operand data. At this time, the address may be the combination of an instruction code applied next to the aforementioned specific instruction and operand data. By performing such processing to all the addresses, it becomes possible for the user to set the RAM 22 as the ALU.

Use of the memory device such as RAM 22 as the ALU brings about the following advantages. First, such a special operation as the addition of "7F (hexadecimal notation)+7F (hexadecimal notation)" with the result of "7F (hexadecimal notation)" can be performed in only one step. More specifically, what should be done is to write resulting data "7F" in advance at an address defined by the combination of "instruction code for addition", "7F" and "7F". Accordingly, it becomes unnecessary to use a plurality of processing cycles as in the conventional ALU, and therefore this operation can be executed at the same speed as the hard-wired logic. Further, when the memory device such as RAM 22 is used, there is extremely high degree of freedom in setting relation between the operand data and the output associated therewith. For example, complicated means is necessary for implementing a non-linear function when the conventional hard-wired logic is used. There may be a function which cannot at all be realized by the hard-wired logic. When the RAM is used, what is necessary is to establish specific correspondence between the input and output only, and therefore even a function which is difficult to be implemented by the conventional hard-wired logic can readily be realized.

The capacity of RAM 22 necessary for realizing ALU 20 can be calculated easily. Assume that the instruction code has 4 bits (i=4), and first and second operand data and resulting data each have 8 bits (n=8). The address length is 4+8+8=20 bits, and therefore the number of addresses which can be designated is $2^{20}$. The resulting data has 8 bits=1 byte per address, and therefore the necessary storage capacity of the RAM constituting the ALU is $2^{20}$ bytes=1M byte.

Figure 10:
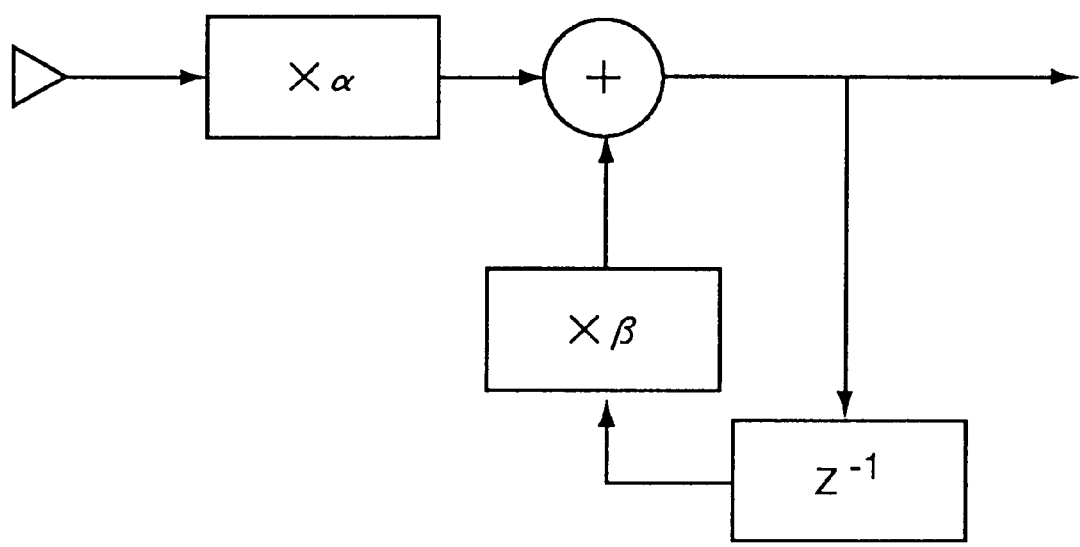
FIG. 10 shows content of an exemplary processing of the IIR filter.

Further, when the RAM is used in this manner, a series of complicated processings can be done only in one step to obtain the same result as the process executed in the conventional manner, provided that specific correspondence between the input and output of the series of processings can be specified. For example, in IIR filter shown in FIG. 10, the result of filtering can be uniquely obtained from the present data one clock before. Therefore, by determining an instruction code for executing the function of IIR filter shown in FIG. 10, using, as present data, the first operand and as the data one clock before, the other operand, and calculating combination thereof in advance, it is possible to obtain in advance all the data which would result from the function of IIR filter shown in FIG. 10. For another IIR filter having different filter characteristics, similar desired results can be calculated in advance, by allotting another instruction code. By writing all these results in RAM 22, the result of processing by the IIR filter shown in FIG. 10, for example, can be obtained only in one read cycle of the memory. Accordingly, ALU 20 using the RAM 22 has extremely high efficiency in processing for the specific application. Even an instruction which is to be described as a program can be described by only one user-described instruction, unlike the conventional processing in which there would be a plurality of instructions, which means that efficiency in developing a system is also improved. Further, as already described, processing which would have been done in a number of steps conventionally can be executed by only one step. Therefore, it is expected that the speed of operation of the overall system will be surprisingly improved.

In the example shown in FIG. 1, RAM 22 is used as the memory device for storing resulting data for the combination of instruction code and operand data in advance. However, it is apparent that the available memory device is not limited to RAM. For example, a mask RAM, an erasable RAM or a nonvolatile memory device such as a nonvolatile RAM may be used. Characteristics common to these is that arbitrary data can be written to a specific address, and that the data written in this manner can be read as needed.

In a mask ROM, data is written during the steps of manufacturing, and therefore, generally, user cannot directly write data. However, simply by providing combination of instruction code, operand data and resulting data to realize the users desired function to the manufacturer, an ALU desired by the user can be obtained by the manufacturer writing the provided combination.

As for the method of writing data to such a memory device, in addition to the method described above, a circuit for testing the memory device may be utilized. Such a test circuit is often provided for a microprocessor containing the ALU. Using such test circuitry, it is possible to directly store desired data at the desired address.

Figure 2:
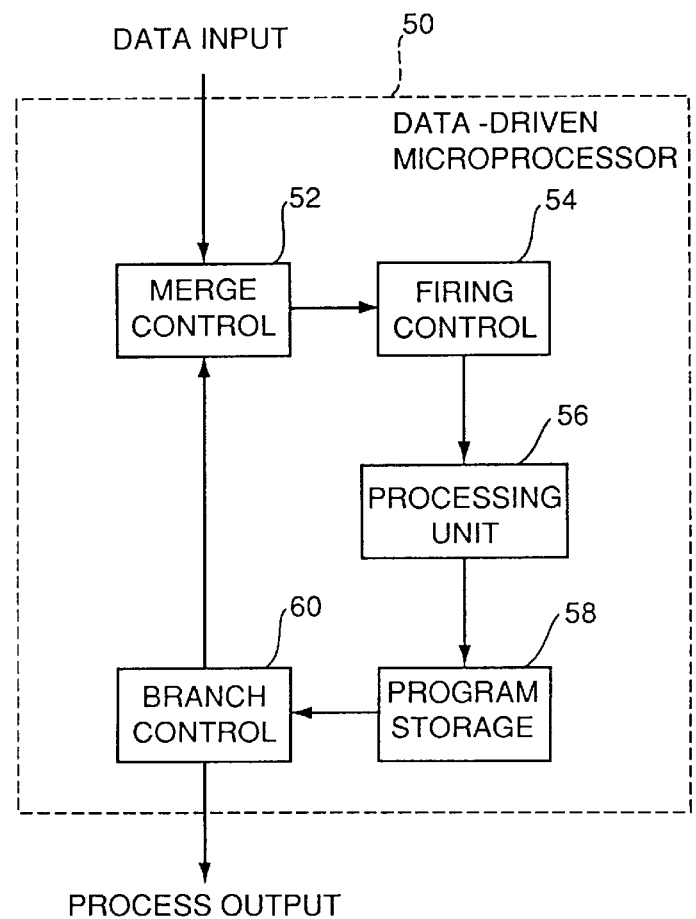
FIG. 2 is a block diagram of a data driven microprocessor using the ALU in accordance with the first embodiment.

FIG. 2 schematically shows a structure of a data driven microprocessor as an example of the microprocessor using ALU 20 of FIG. 1. Referring to FIG. 2, data driven microprocessor 50 includes a merge control 52 for merging an externally applied data packet and a data packet circulating in microprocessor 50; a firing control 54 for matching packets applied from merge control 52, detecting a pair of packets having matching firing conditions and for outputting a data packet having all the data necessary for processing; a processing unit 56 receiving the data packet from firing control 50 and performing operation; a program storage 58 receiving a data packet representing result of operation from processing unit 56, reading instruction and destination data from the address indicated by the data packet, and outputting it in the form of a data packet, storing data flow program in advance; and a branch control 60 for branching the data packet to the outside of microprocessor 50 or merge control 50, based on the destination data of the data packet applied from program storage 58.

The data driven microprocessor 50 shown in FIG. 2 processes immediately when there is a pair of data packets having processing conditions satisfied, among successively applied data packets. Therefore, a plurality of different processings can be performed in parallel. Such a data driven microprocessor is especially suitable for processing data in the field of video and image processing.

In such a device, if a number of cycles are necessary to process a specific data packet, processing efficiency lowers unavoidably, when a plural cycles are to be executed in processing unit 56 or when data packets are to be circulated several times in microprocessor 50. Application of ALU 20 shown in FIG. 1 is proposed for the processing unit 56. As already described, in the field handling video and image data, it is necessary to perform special processings to address underflow/overflow and the like. In the conventional ALU using hard-wired logic, such special processing is not desirable as it requires several cycles. However, in the ALU of the present invention shown in FIG. 1, it can be processed in only one cycle. This helps data driven microprocessor to fully exhibit its performance.

In order to store desired data in the memory device of processing unit 56 of data driven microprocessor 50 shown in FIG. 2, there are various possible methods. The first possible method is to apply as data input, a data packet which has an instruction for which data is to be stored in the memory device of processing unit 56, in the similar manner as a common data packet. Since a data packet is used for storing a program in program storage 58, it is possible to store desired data in the memory device of processing unit 56 by using the same method.

Alternatively, if microprocessor 50 is provided with a circuitry for testing the memory device of processing unit 56, it is possible to directly store data in the memory device by using the circuitry.

Figure 3:
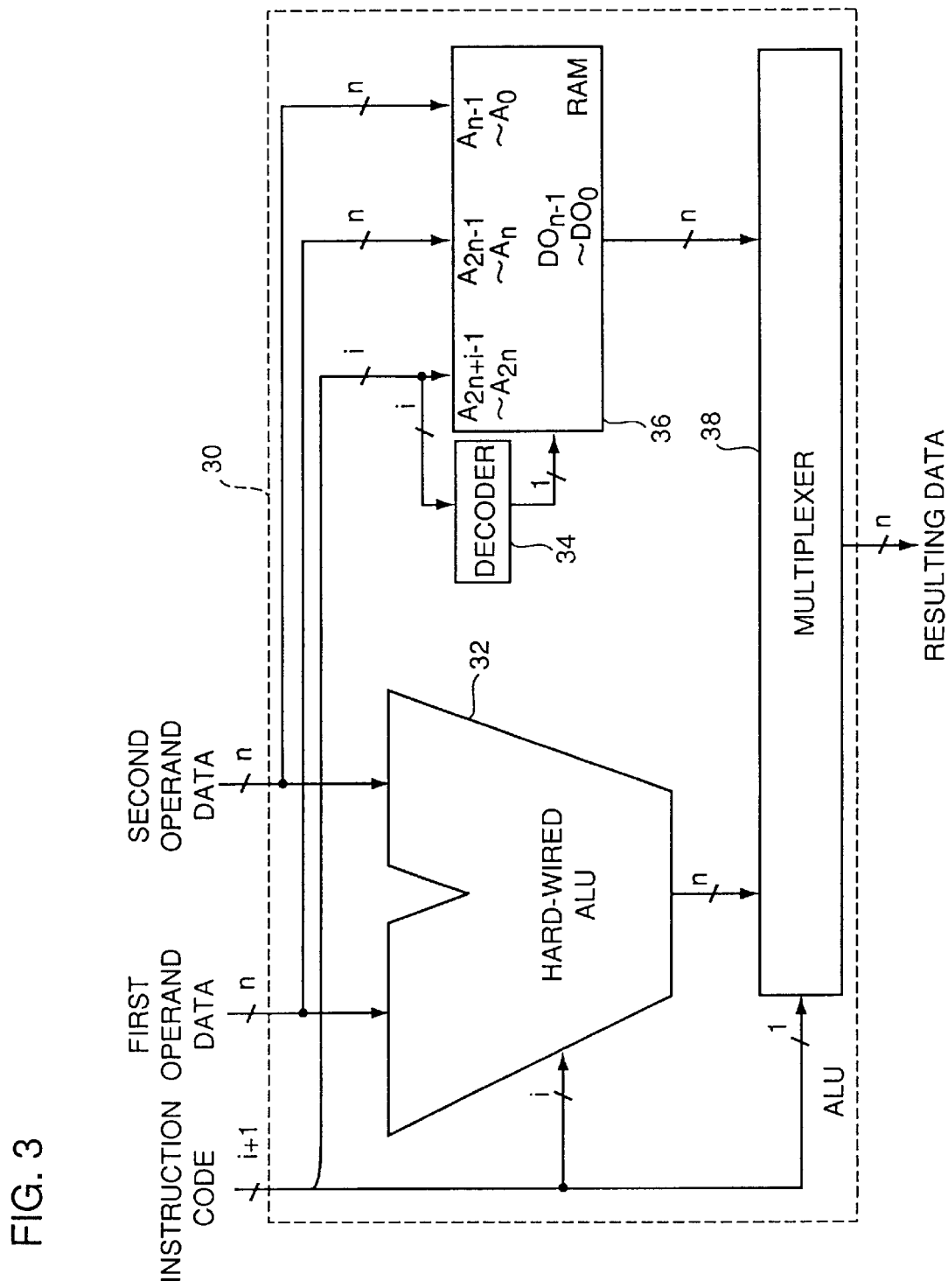
FIG. 3 is a block diagram of an ALU in accordance with a second embodiment of the present invention.

FIG. 3 schematically shows the structure of the ALU in accordance with the second embodiment of the present invention. Referring to FIG. 3, ALU 30 includes an ALU 30 constituted by hard-wired logic similar to the conventional ALU, an RAM 36 similar to the RAM shown in FIG. 1, a decoder 34 similar to decoder 24 shown in FIG. 1, and a multiplexer 38 receiving a specific 1 bit (most significant bit in the present embodiment) of the instruction code, for selecting and outputting either one of the outputs form ALU 32 and RAM 36. It is assumed that the number of bits of the instruction code used in the ALU of the second embodiment is i+1 bits, that of the operand data is n bits, and the resulting data also has the bit width of n bits.

Of the i+1 bit instruction code, the lower i bits are applied to ALU 32, RAM 36 and decoder 34. First and second operand data are applied to respective inputs of ALU 32 and RAM 36. Lower i bits of the instruction code, n bits of the first operand data and n bits of the second operand data applied to RAM 36 are used for address designation of RAM 36.

Decoder 34 decodes i bits of instruction code applied to RAM 36, and applies to RAM 36 a signal for setting RAM 36 to a prescribed operation mode, in accordance with reading or writing. Multiplexer 38 is for selecting and outputting the output from ALU 32 when the most significant 1 bit of the instruction code is 0, and the output from RAM 36 when it is 1.

Figures 4, 5:
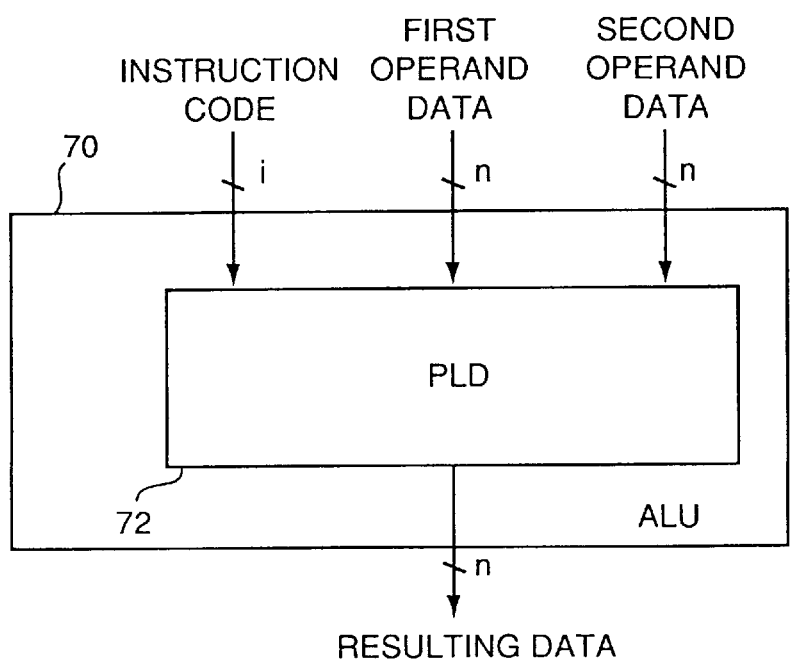
FIG. 4 shows, in a table, instruction set of an ALU in accordance with a third embodiment of the present invention.
FIG. 5 is a block diagram of the ALU in accordance with the third embodiment of the present invention.

FIG. 4 shows, in a table, instruction set used in ALU 30. In this example, it is assumed that i=4. Referring to FIG. 4, instructions for operating ALU 32 are predetermined for each of instruction codes 0 to 15. Instruction codes 16 to 31 can be set freely by the user, as user-defined area. The user allots desired function to each of instruction codes 16 to 31, and resulting data to be obtained corresponding to the combination of the instruction code and operand data to be applied for the instruction code are calculated in advance. The resulting data are written to RAM 36, using the combination of the instruction code and corresponding operand data as an address. In this manner, it becomes possible for the user to have the desired function realized by the instruction codes 16 to 31.

Which instruction codes are to be realized by ALU 32 and which instruction codes are to be used as user-defined area are predetermined by the supplier of the ALU. Using the ALU thus provided, the user completes the ALU optimally adapted for his/her specific application.

FIG. 5 schematically shows a structure of an ALU in accordance with the third embodiment of the present invention. ALU 70 includes a not-yet programmed PLD (Programmable Logic Device) 72. The PLD is connected to receive an instruction code of i bits, the first operand data of n bits and the second operand data of n bits and to output resulting data of n bits. ALU 70 containing a not-yet programmed PLD 72 at the time of delivery allows the user to freely program the PLD to realize a desired instruction.

It is not always necessary for the user to program the PLD 72. Supplier of the ALU may program PLD to realize a desired instruction given by the user.

Conventionally, there have been various and many systems designed and realized by using a plurality of PLDs. However, one incorporating a PLD which can be programmed to realize only a certain instruction set such as ALU 70 in accordance with the third embodiment, has not been known. ALU 70 of the third embodiment is only to execute an instruction, and the system is realized for the first time when the program consisting of user-defined instructions stored in other memory device is executed by ALU 70 under a prescribed control. In other words, ALU 70 and the microprocessor incorporating ALU 70 has higher flexibility than the conventional system configuration using PLDs only, in that the operation can be changed by programming.

Figure 6:
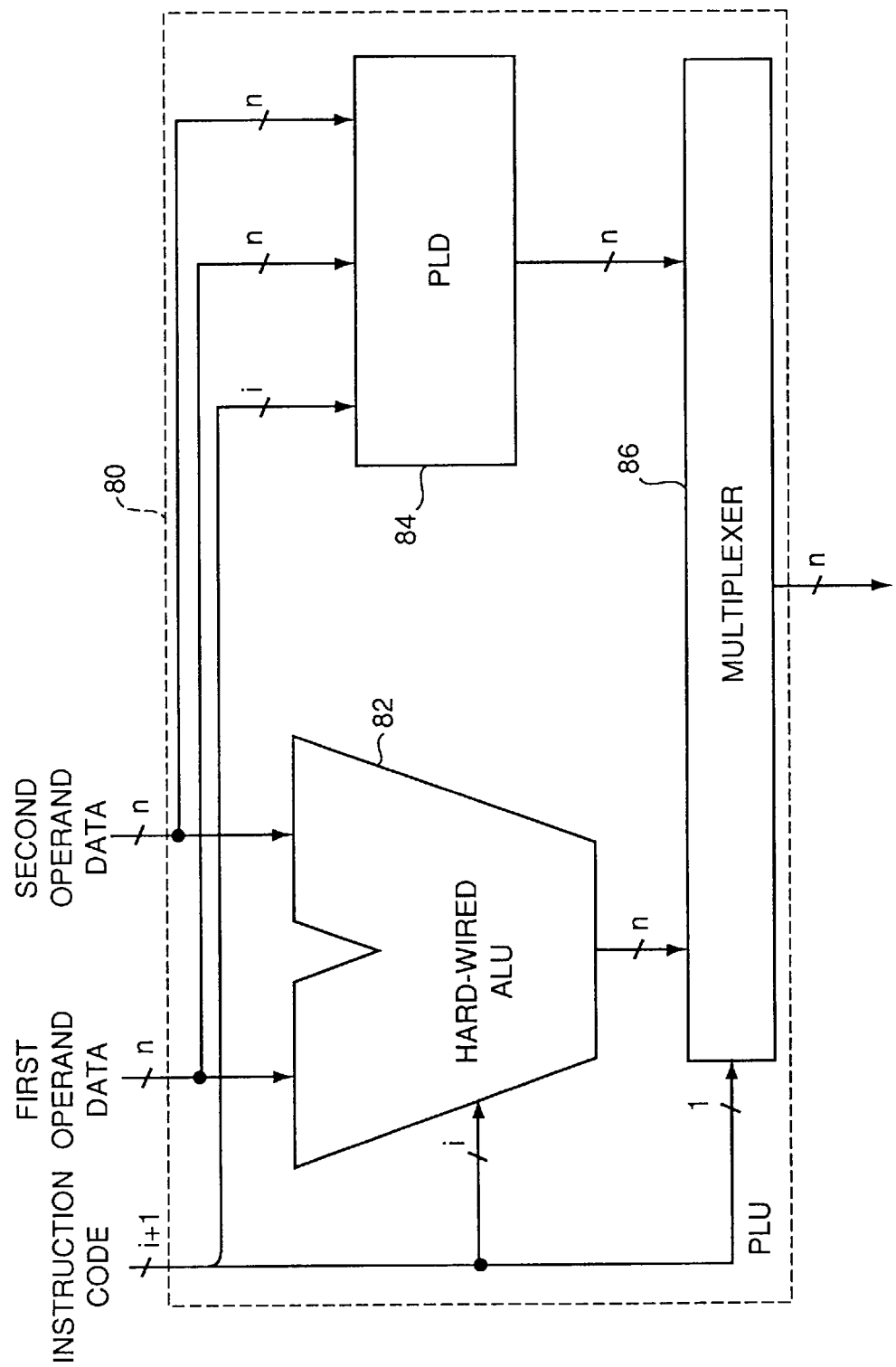
FIG. 6 is a block diagram of an ALU in accordance with the fourth embodiment of the present invention.

FIG. 6 is a schematic block diagram of the ALU in accordance with a fourth embodiment of the present invention. Referring to FIG. 6, ALU 80 is for receiving an instruction code of i+1 bits, the first operand data of n bits and a second operand data of n bits, and for outputting resulting data of n bits. ALU 80 includes an ALU 82 receiving lower i bits of the instruction code as the instruction code, performing a processing designated by the instruction code on the first and second operand data and for outputting data of n bits, a PLD 84 adapted to receive lower i bits of the instruction code, n bits of the first operand data and n bits of the second operand data and connected to the peripheral circuitry to output resulting data of n bits, and a multiplxer 86 receiving upper 1 bit of the instruction code, selecting one of the outputs from ALU 82 and PLD 84 and outputting the selected one as the resulting data.

ALU 82 is similar to the ALU consisting of the conventional hard-wired logic. PLD 84 is not yet programmed, and programmable by the user. In this case also, instructions with the highest 1 bit being 0 are pre-fixed, and instructions with the highest 1 bit being 1 are user-definable ones. It is possible for the user to pre-program PLD 84 so as to realize a desired operation corresponding to a desired instruction code. In this manner, it is possible to process general purpose instructions by ALU 82 and instructions for specific application by PLD 84. Accordingly, an ALU which can operate especially efficiently for the special application can be provided.

The number of gates included in the PLD is determined by the supplier of the PLD. Therefore, when the ALU is to be assembled using the PLD, programmable functions are limited dependent on the number of gates of the PLD used. However, as compared with an example employing memories, circuit scale can be advantageously reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An arithmetic logic unit comprising:
   a memory, at least part of which has a user-defined instruction area, for storing data, and for outputting the stored data when an instruction code is applicable as an address to said user-defined instruction area; and,
   a hard-wired ALU for executing an operation based upon an instruction which is not applicable as an address to said user-defined instruction area,
   wherein the arithmetic logic unit executes instructions belonging to said user-defined instruction area at a clock frequency equal to that of the hard-wired ALU.

2. The arithmetic logic unit of claim 1, further comprising
   a selector for receiving an instruction code to select and operate either the memory or the hard-wired ALU.

3. The arithmetic logic unit according to claim 2, wherein said memory includes a random access memory.

4. The arithmetic logic unit according to claim 2, wherein said memory includes a mask ROM.

5. The arithmetic logic unit according to claim 2, wherein said memory includes a nonvolatile memory allowing writing and reading of arbitrary data at an arbitrary address.

6. The arithmetic logic unit according to claim 2, wherein said memory allows writing and reading of arbitrary data at an arbitrary address, and
   said arithmetic logic unit further includes
   an instruction decoder for decoding part of an instruction code to selectively set said memory to a read mode or write mode.

7. The arithmetic logic unit according to claim 1, wherein said memory includes a random access memory.

8. The arithmetic logic unit according to claim 1, wherein said memory includes a mask ROM.

9. The arithmetic logic unit according to claim 1, wherein said memory includes a nonvolatile memory allowing writing and reading of arbitrary data at an arbitrary address.

10. The arithmetic logic unit according to claim 1, wherein
    said memory allows writing and reading of arbitrary data at an arbitrary address,
    said arithmetic logic unit further includes
    an instruction decoder for decoding part of an instruction code to selectively set said memory to a read mode or write mode.

11. An arithmetic logic unit according to claim 1, wherein the memory outputs stored data when an instruction code and an operand data are applied as an address.

12. An arithmetic logic unit having a user-defined instruction area, comprising:
    a programmable logic device adapted to receive an instruction from the user-defined instruction area to organize a desired logic; and
    a hard-wired ALU for executing an operation based upon an instruction which is not applicable to said user-defined instruction area,
    wherein the arithmetic logic unit executes instructions belonging to said user-defined instruction area at a clock frequency equal to that of the hard-wired ALU.

13. The arithmetic logic unit according to claim 12, further including
    a selector for receiving an instruction code to select and operate either the programmable logic device or the hard-wired ALU.

14. An arithmetic logic unit according to claim 12, wherein the programmable logic device is adapted to receive an instruction code and operand data.

15. A microprocessor-based system, comprising:
    a memory, at least part of which has a user-defined instruction area, for storing data, and for outputting the stored data when an instruction code belonging to said user-defined instruction area and an operand data are applied as an address;
    an instruction memory for storing an instruction belonging to the user-defined instruction area; and a hard-wired ALU for executing an operation based upon an instruction which is not applicable as an address to said user-defined instruction area.

16. The system according to claim 15, wherein said instruction memory stores an instruction belonging to an area other than said user-defined instruction area, and wherein said system further includes, a selector for receiving an instruction code to select and operate either the memory or the hard-wired ALU.

17. The system according to claim 16, wherein said memory includes a random access memory.

18. The microprocessor according to claim 16, wherein said memory includes a mask ROM.

19. The system according to claim 16, wherein said memory includes a nonvolatile memory allowing writing and reading of arbitrary data at an arbitrary address.

20. The system according to claim 16, wherein said memory allows writing and reading of arbitrary data at an arbitrary address, said microprocessor further including an instruction decoder for decoding part of an instruction code to selectively set said memory to a read mode or write mode.

21. The system according to claim 15, wherein said memory includes a random access memory.

22. The system according to claim 15, wherein said memory includes a mask ROM.

23. The system according to claim 15, wherein said memory includes a nonvolatile memory allowing writing and reading of arbitrary data at an arbitrary address.

24. The system according to claim 15, wherein said memory allows writing and reading of arbitrary data at an arbitrary address, said microprocessor further comprising an instruction decoder decoding part of an instruction code for selectively setting said memory to read mode or write mode.

25. The system according to claim 15, further including an instruction read control circuit for controlling reading from said instruction memory so that an instruction stored in the instruction memory is applied to the memory in an order determined by an output from the memory.

26. An microprocessor-based system having a user-defined instruction area, comprising:

a programmable logic device adapted to receive an instruction from the user-defined instruction area to organize a desired logic;

an instruction memory for storing an instruction belonging to the user-defined instruction area; and a hard-wired ALU for executing an operation based upon an instruction which is not applicable to said user-defined instruction area, wherein the arithmetic logic unit executes instructions belonging to said user-defined instruction area at a clock frequency equal to that of the hard-wired ALU.

27. The system according to claim 26, wherein said instruction memory stores an instruction belonging to an area other than user-defined instruction area; and wherein said microprocessor-based system further includes a selector for receiving an instruction code to select and operate either the memory or the hard-wired ALU.

28. The system according to claim 26, further including an instruction read control circuit for controlling reading of the instruction memory so that an instruction stored in the instruction memory is applied to the programmable logic device in an order determined by an output from the programmable logic device.

29. The system according to claim 23, wherein the programmable logic device is adapted to receive an instruction code and operand data.

* * * * *